July 22, 1969 W. H. ORR 3,457,526

NOTCH FILTER

Filed May 11, 1965 3 Sheets-Sheet 1

INVENTOR
W. H. ORR
BY Leo Stanger
ATTORNEY

NOTCH FILTER

Filed May 11, 1965

3 Sheets-Sheet 3

United States Patent Office 3,457,526
Patented July 22, 1969

3,457,526
NOTCH FILTER

William H. Orr, Summit, N.J., assignor to Bell Telephone Laboratories, Incorporated, New York, N.Y., a corporation of New York Filed May 11, 1965, Ser. No. 454,890
Int. Cl. H03j 3/26
U.S. Cl. 333—75 16 Claims

ABSTRACT OF THE DISCLOSURE

A parallel twin-T notch filter comprises six components including an output resistor. The five components other than the output resistor have values that, with an output resistor of predetermined value tune the filter to a perfect notch frequency. The output resistor comprises one of many selectable resistance values, the smallest of which exceeds the predetermined value by at least 1.5 and the center of these resistance values is at least twice the predetermined value. Thus, varying the single resistor through several resistance values can tune the filter over a 30 percent range while changing the transmission coefficient of the filter less than 1 decibel, and while maintaining substantially constant the rate of change of phase in the vicinity of each notch frequency.

This invention relates to tunable electrical circuits and particularly to circuits, such as multifrequency narrow-band oscillators, that take advantage of the phase-frequency characteristics of a parallel twin-T "notch" filter.

Such filters comprise a high-pass T-section of the RC type, parallel connected with an RC low-pass T-section. They attenuate signals of one frequency in a spectrum, thereby forming a "notch" in the spectrum at that frequency. More important for oscillators, they shift the phase of a signal oscillating at the "notch" frequency by 180° but sharply depart from this phase for signals only slightly away from the notch frequency. Thus in the feedback loop of an oscillator whose amplifier has already shifted the phase 180°, their additional 180° phase shift produces regenerative feedback at the notch frequency, but their sharp phase departure at other frequencies suppresses these non-notch frequencies. This phase departure effect is most pronounced in so-called "perfect"-notch filters. Unfortunately, such perfect-notch filters are unsuitable in oscillator feedback loops because at the notch frequency when the phase shift is 180° their attenuation is all but absolute. Deviation from the perfect-notch condition decreases the notch depth but also spoils the phase departure effect. To take advantage of the high phase departure of notch filters it is common to deepen the notch to as close to the perfect-notch as the other components of the circuit, such as the amplifier in an oscillator, will allow.

Notch filters constitute suitable means for tuning oscillators that generate only one narrow-band frequency. To operate at several frequencies with equal selectivity the oscillator should have a notch filter that can be tuned to the several frequencies at which it exhibits the same phase departure effect. Unfortunately, shifting the notch frequency of close-to-perfect notch filters over any range while maintaining essentially the same phase departure creates considerable difficulty. Generally it requires simultaneously changing several of the six parameters in the twin-T filter. A switchable oscillator employing such a filter must then use multiposition ganged switches and duplicate components. Such duplication in switching is quite wasteful and undesirable in cramped environments such as a thin-film circuit where the components should be few and compact.

An object of the invention is to improve variable frequency oscillators, particularly those having narrow frequency outputs.

Another object of the invention is to employ a notch filter in a variable-frequency constant-selectivity oscillator so as to produce narrow-band feedback while switching between different values of as few components as possible, preferably to alter the frequency over a predetermined range while nevertheless maintaining substantially constant feedback phase-departure effects.

Another object of the invention is to improve switchable notch filters.

Another object in the above oscillators is to switch a notch filter between frequencies with a switch having only a single selector arm.

According to the invention these ends are obtainable in an oscillator circuit by feeding the output of an amplifier back to the input through a twin-T notch filter which is tunable to a perfect-notch frequency with a predetermined output resistor value, but wherein the output resistor comprises one of many selectable resistance members the smallest of which exceeds the predetermined perfect-notch value by at least 1.5; the center value of these resistance members is at least twice the predetermined value, so that the center value resistance member tunes the filter to a notch frequency less than 0.7 times the perfect-notch frequency. Partically, the variation of the notch frequency over a range of 35 percent, which might otherwise vary the rate of phase change through the notches at several notch frequencies a few hundred percent, actually varies the rate only 8 percent. The transmission coefficients, that determine these rates of phase change, at these notch frequencies vary less than one decibel.

This invention is based upon the discovery that the locus of notch depths of a notch filter forms the expected rising characteristic as the output resistor increases or decreases from a perfect notch condition; but that if the value of the output resistor increases sufficiently, the characteristic eventually descends; that between the ascending and descending portions of the characteristic there is a broad, substantially level range; that in this level range the phase changes are substantially the same; and that the phase-shift change rates at the notches conform to the notch depths in this level range.

These and other features of the invention are pointed out in the claims. Other objects and advantages of the invention will be obvious from the following detailed description when read in light of the accompanying drawings, wherein:

Figure 1:
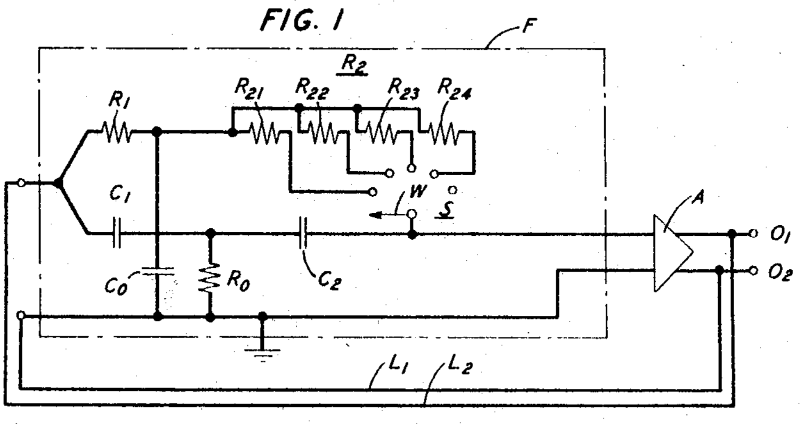
FIG. 1 is a schematic diagram of an oscillator embodying features of the invention.

In the oscillator of FIG. 1 a broad-band amplifier A, while amplifying signals appearing at its input, shifts them 180°. The signals appear at two oscillator output terminals $O_1$ and $O_2$. A variable-frequency notch filter of the parallel twin-T type completes a feedback loop with the amplifier A by feeding some of the energy appearing at the output terminals $O_1$ and $O_2$ back to the input of amplifier A.

The filter F comprises a high-pass T section parallel connected to a low-pass T-section to form the parallel twin-T notch filter. The high-pass T-section includes a ground resistor $R_0$ joining the junction of an input capacitor $C_1$ and an output capacitor $C_2$ connected as shown. Forming the low-pass T-section is ground capacitor $C_0$ that joins the connection of an input resistor $R_1$ and a composite output resistor generally designated $R_2$. The latter is composed of four resistor members $R_{21}$, $R_{22}$, $R_{23}$, and $R_{24}$, all connected to resistor $R_1$, as well as a selector switch S, whose wiper W selectively connects one of the four resistor members to capacitor $C_2$ so as to complete the circuit. Thus the switch S sets the resistor $R_2$ to one of four values.

The components of the oscillator in FIG. 1 are deposited as thin films and have the following values (these are exemplary only and should not be taken as limiting):

| | | |
|---|---|---|
| $C_0$ | microfarad | 0.01 |
| $C_1$ | do | 0.01 |
| $C_2$ | do | 0.01 |
| $R_0$ | ohms | 3,800.0 |
| $R_1$ | do | 10,000.0 |
| $R_{21}$ | do | 63,586.5 |
| $R_{22}$ | do | 79,675.3 |
| $R_{23}$ | do | 99,863.6 |
| $R_{24}$ | do | 124,294.6 |

In operation the amplifier A amplifies signals appearing at its input and feeds them to the output terminals $O_1$ and $O_2$. At the same time it shifts the phase of these signals 180° and also feeds them to the input of the filter F, whose signal transfer depends upon the position of the wiper W. The component values of the filter F are such that for each value to which the wiper W sets the resistor $R_2$ there is one frequency, the notch frequency, at which the filter shifts the phase of signals at its input 180°. The signal, with this additional 180° phase shift at one frequency, when applied to the input of the amplifier A creates a regenerative feedback that, with sufficient amplification, sustains oscillations at this notch frequency.

One of the most useful aspects of the filter F arises from its ability to assure an oscillator output having a comparatively narrow bandwidth. This is so because the phase shift at each of the frequencies selected by wiper W departs rapidly from 180° in response to only small departures of frequency from the notch frequency. Thus only a narrow range of frequencies is fed back regeneratively to the amplifier A.

The selectivity of the oscillator in FIG. 1 depends upon the rate of phase-shift change for frequency changes of the filter F at the frequency whose signal is shifted 180° for any value of $R_2$; that is to say, the phase-shift change rate of the filter at the notch frequency determines the selectivity of the oscillator. For constant selectivity at the frequencies to which the oscillator is tuned, the phase-shift change rate at the notch frequencies, at which 180° phase shift occurs, must be essentially equal regardless of the position which the wiper W assumes.

In addition to introducing a phase shift, the filter F attenuates signals appearing at its input. At the notch frequency to which the filter F is tuned by members of resistor $R_2$ and at which 180° phase shift occurs, the attenuation is maximum. The transmission coefficient $T_0$, i.e., the ratio in decibels of filter output signal to filter input signal, is minimum.

Figure 2:
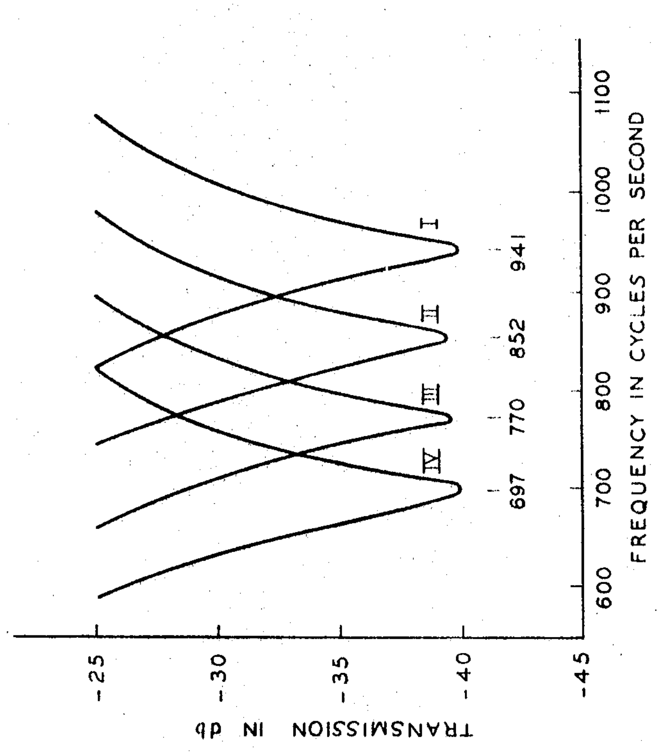
FIG. 2 is a graph of the responses of the notch filter in FIG. 1 with respect to frequency and at several positions of a switch in FIG. 1.

FIG. 2 illustrates the transmission coefficient of the filter F for various frequencies and different positions of the wiper W. Curve I of FIG. 2 illustrates the variation in transmission coefficient (attenuation in decibels) for the filter F when the wiper connects the resistor member $R_{21}$ into the circuit. Curves II, III, and IV illustrate the respective transmission coefficients for various frequencies of the filter F when the wiper W connects the respective resistor members $R_{22}$, $R_{23}$, and $R_{24}$. In each curve the notch frequency, occurring at the minimum of the curve, is the one at which 180° phase shift occurs.

With wiper W connecting respective resistors $R_{21}$, $R_{22}$, $R_{23}$, and $R_{24}$, the notch frequencies are 941, 852, 770, and 697 cycles. The respective transmission coefficients are −40.0, −39.4, −39.5, and −40.0 decibels. The respective rates of phase-shift change for changes in frequency, $d\theta/df$ ($\theta$=phase shift, $f$=frequency), at the four notch frequencies were calculated as 2.4, 2.3, 2.4, and 2.5 degrees per cycle.

The above shows that switching the wiper to any of the resistor members in resistor $R_2$ changes the notch frequency, i.e., the frequency at which 180° phase shift occurs and therefore the frequency at which the oscillator operates, over a range of 35 percent above the low frequency. Yet the rates of phase-shift variation for changes in frequency, $d\theta/df$, which might otherwise vary several hundred percent, vary only 8 percent. Since bandwidths depend on $d\theta/df$, the constant $d\theta/df$ assures a correspondingly constant bandwidth range in the oscillator of FIG. 1 over the notch frequencies.

The transmission coefficient of the filter at each of the notch frequencies varies less than 0.6 decibel. This constant transmission coefficient at the various notch frequencies accompanying the substantially equal phase change rates is highly beneficial. On the one hand it assures that an amplifier A furnishing sufficient loop gain to sustain oscillations at one frequency will do so at the others. On the other hand it prevents the amplifier A from being overloaded by excess of positive feedback in the less deep notches. If the notches were not of substantially equal depth, it is quite likely that the less deep notches would tend to overdrive the amplifiers and produce secondary effects that may actually shift the frequencies to which the oscillator is tuned. Too deep notches would prevent oscillations.

The substantially constant rates of phase-shift change over large variations in notch frequency and values of $R_2$ are contrary to the generally expected response of a notch filter. Its operation depends upon substantial conformance to the following relationships:

$$R_2 \geq 1.5 \frac{R_1 R_0 (C_1 + C_2)}{C_0 R_1 - R_0 (C_1 + C_2)}$$

and $$R_{23} > 2 \frac{R_1 R_0 (C_1 + C_2)}{C_0 R_1 - R_0 (C_1 + C_2)}$$

The significance of the constant rates of phase-shift change for changes in the notch frequency, the constant transmission coefficients, and the rapid departure from the 180° phase shift at non-notch frequencies may be best appreciated from a general consideration of notch filters.

Figure 3:
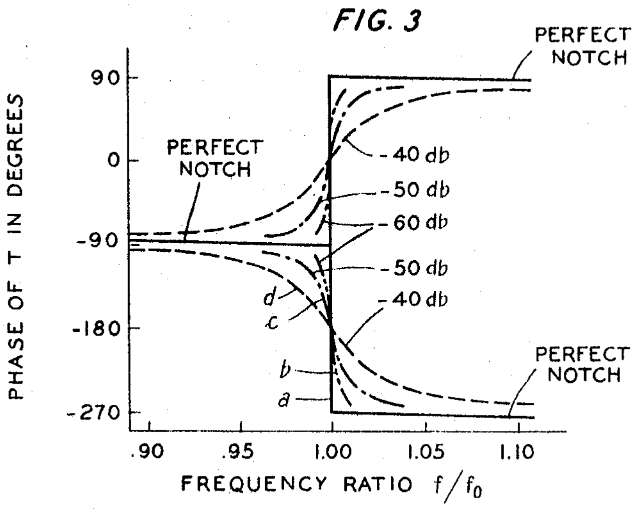
FIG. 3 is a graph illustrating the phase angles of notch filters in the vicinity of the notch frequency.

FIG. 3 illustrates four curves *a*, *b*, *c*, and *d* of the phase shift in degrees relative to fractions of the notch frequency $f_0$ for four notch filters. In each case the phase shift change rate depends upon the component values. The transmission coefficient in decibels of these four filters relative to fractions of the notch frequency are shown by the respective curves *a*, *b*, *c*, and *d* of FIG. 4. A comparison of FIGS. 3 and 4 reveals that the more drastic the change in phase shift at the notch frequency in FIG. 3, the deeper the notch in FIG. 4. In fact, the phase-shift change varies inversely to, and is largely determined by, the notch depth.

Figure 5:
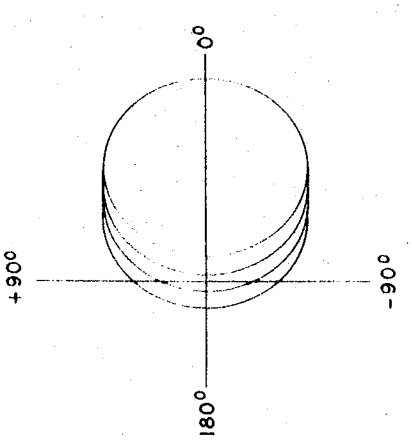
FIG. 5 is a polar coordinate graph of several notch filters.

FIG. 3 shows that there exist notch filters whose phase shifts can pass through 0° at the notch frequency and that the phase shifts here vary with the notch depths. Filters whose noches have phase shifts at 0° exist when the polar coordinate graph of the filter response with respect to changing frequency fails to embrace the origin. FIG. 5 shows four response curves on such a polar coordinate graph for four notch filters, two of which impart 0° phase shifts at the notches. The notches occur on the abscissa near the origin. In FIG. 5 the departures of the curves from the origin are exaggerated for emphasis. Only the filters imparting 180° phase shifts to input signals are considered in the following discussion.

A vast shift in phase from 180° for a small frequency variation in the filter F, for example, can assure that virtually all frequencies but a small range about the notch frequency will be far enough away from the required 360° phase shift in the loop of the oscillator in FIG. 1 to be substantially suppressed. However, the resulting narrow-band oscillator requires a high-gain amplifier A to make up for the great attenuation accompanying the drastic phase shift changes at the notch frequency.

Figure 4:
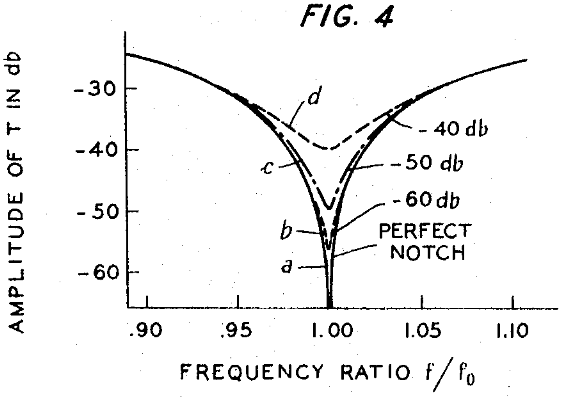
FIG. 4 is a graph illustrating the amplitude responses of notch filters in the vicinity of the notch frequency.

The ultimate in drastic phase-shift change from 180°, and hence the most desirable phase shift change for narrow-band oscillators, is shown by curves *a* in FIGS. 3 and 4 and occurs for so-called perfect notch filters. These filters have components related to each other as follows:

$$\frac{\frac{1}{R_1}+\frac{1}{R_2}}{\frac{1}{R_0}}=\frac{C_0}{C_1+C_2}$$

In the case of the usually-used balanced, perfect, notch filters, $R_1=R_2=2R_0$ and $C_1=C_2=\frac{1}{2}C_0$. However, FIG. 4 shows that perfect-notch filters also attenuate the input signal almost completely. Oscillators having perfect notch filters would require amplifiers with virtually infinite amplification. To avoid this it has been the practice to depart from the component values of a perfect notch filter so as to require only reasonable amplification but close enough to perfect-notch conditions to assure a rapid phase-shift change at the notch frequency. This is no problem if the oscillator is a single frequency device. However, it is difficult to tune an oscillator by switching between several notch frequencies in the vicinity of a perfect notch frequency and yet maintain a constant narrow bandwidth without varying several filter components simultaneously. Changing a single component, as is desirable in a small circuit such as a thin-film circuit, causes marked changes in the filter bandwidth in the vicinity of the perfect-notch frequency.

The invention avoids the need for changing several components simultaneously. The members $R_0$, $R_1$, $C_0$, $C_1$, and $C_2$ are assigned values so that there can exist a value $R_2'$ of resistor $R_2$ which will satisfy the equation for a perfect-notch filter. However, in the illustrated case the filter F is tuned not to the vicinity of a perfect-notch frequency $f_0'$ but to a frequency $f_0$ in the range $0.55 f_0'<f_0<0.8f_0'$ by varying the value of $R_2$ so that $2R_2'<R_2<4R_2'$. Within this range the attenuations and hence the bandwidths at the notches vary only slightly. Thus a single switch S varying the value of resistor $R_2$ by moving the wiper W between the resistor members $R_{21}$ to $R_{24}$ permits frequency variations in the oscillator of FIG. 1 while nevertheless maintaining a substantially constant input to the amplifier A and substantially equal narrow bandwidths. As a general point in this embodiment, $$\left(\frac{f_{max}}{f_{min}}\right)^2<\frac{R_{2max}}{R_{2min}}<\left(\frac{f_{max}}{f_{min}}\right)^4$$

For a 40 percent change in $f$, $$\frac{f_{max}}{f_{min}}=1.4$$

and $$2<\frac{R_{2max}}{R_{2min}}<4$$

The invention is based upon the discovery of a characteristic of the notch filter F. Hitherto it had been assumed that starting with a perfect-notch filter departure of any one of the individual components from the values in a perfect-notch relationship results in an increasing departure from the notch frequency and a continuous lessening of the notch depth. Accompanying this notch depth decrease is a deterioration in the sharpness of the phase characteristics. Thus it was assumed that variation of only one component value would create variances in the notch depth and that therefore notch filters tunable to several frequencies without changing phase-shift change rates were impossible.

The discovery upon which the invention is based agrees that as the value of component $R_2$ starts to increase from the perfect value $R_2'$ at the perfect-notch frequency, the notch depth starts to decrease while the frequency decreases. However, it was discovered that if the increase is great enough, even though accompanied by further decreases in notch frequencies, the notch depths begin to increase again. Furthermore, the discovery noted that the transfer in notch depth from the decreasing to the increasing notch depths falls through a shallow portion covering a wide frequency range. It was also discovered that throughout these ranges the rates of phase-shift change pass through a long, shallow portion too. Moreover, it was discovered that the level of the shallow portion was controllable by the value of $R_1$.

Figure 6:
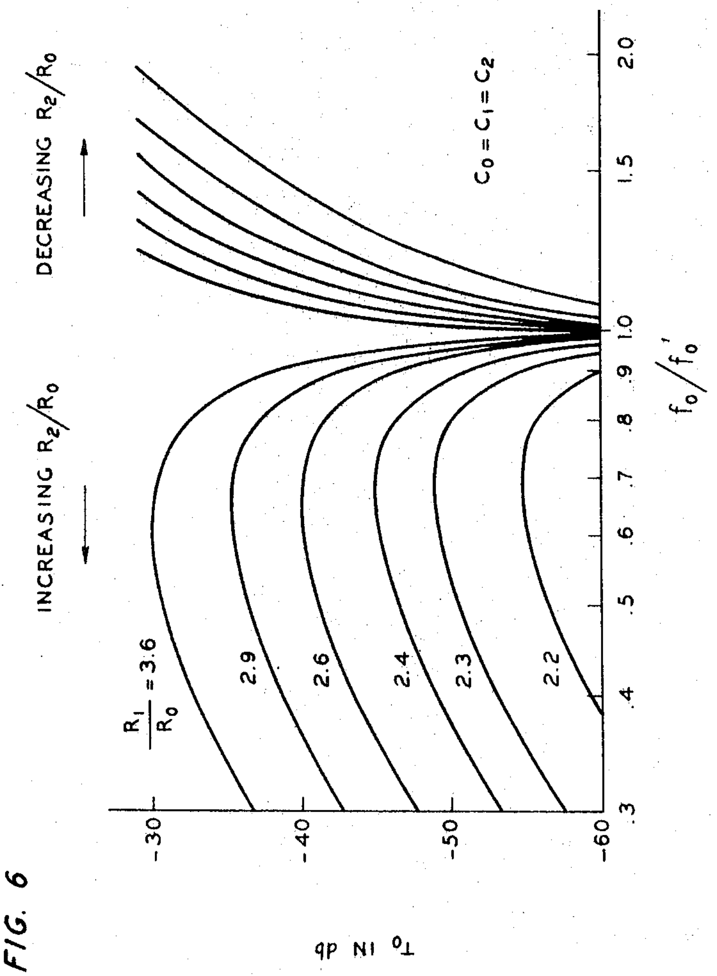
FIG. 6 is a graph illustrating the characteristics of the locus of notch bottoms of a parallel twin-T filter as the value of the output resistor (normalized) varies from the value producing a perfect notch, for several (normalized) values of input resistor.

This is shown by the characteristics of FIG. 6. In FIG. 6 each one of the curves represents, for a constant $R_1/R_0$ ratio and constant values of $C_0$, $C_1$, $C_2$, and $R_0$, the locus of transmission coefficients at the notch bottoms as the notch frequency $f_0$ is made to vary relative to the perfect notch frequency $f_0'$ by changing the value of $R_2$. The frequency ratio $f_0/f_0'$ varies inversely with the value $R_2$. Thus the figure can be said to represent the locus of notch bottom transmission coefficients as $R_2$ changes. Because the notch depths vary with the rates of phase-shift change, FIG. 6 also can be said to represent the inverse of the rates of phase-shift.

FIG. 6 should not be confused with the transmission characteristic of FIG. 2. FIG. 6 represents the locus of notch bottoms and not the transmission curve of a single notch at any particular frequencies.

As was predictable, the first portion of any one of the characteristics shows that whether the value of $R_2$ increases or decreases from its value at a perfect-notch frequency, the transmission coefficient at the notch bottoms increases. However, the second portion of each characteristic shows what was not predictable; namely, that the locus of notch depths reaches a peak and eventually decreases with increasing $R_2$ (decreasing $f$) and that straddling the ascending and descending portions is a broad level range. According to the invention the filter of FIG. 1 operates within the level range straddling the ascending and descending portions of the characteristic. As a result, the rate of phase-shift changes also passes through a level range. The constant phase change assures a constant bandwidth in the oscillator.

The differences in the curves of FIG. 6 result from changing the values of $R_1$. They assume that the value of $C_0=C_1=C_2$. Similar rising and falling characteristics are obtained from other capacitance relationships such as $C_1=C_2=\frac{1}{2}C_0$, $C_1=2C_2=C_0$, and $C_2=C_0=\frac{1}{2}C_1$.

While an embodiment of the invention has been described in detail, it will be obvious to those skilled in the art that the invention may be practiced otherwise without departing from its spirit and scope.

What is claimed is:

1. A frequency variable notch filter comprising ground capacitance means, ground resistance means, input branch capacitance means, input branch resistance means, output capacitance means, and output branch resistance means, said resistance means and said capacitance means being connected to form a twin-T filter, one of said branch resistance means being adjustable to a plurality of resistance values for tuning said twin-T filter to a plurality of discrete notch frequencies while the other of said resistance means and said capacitance means maintain fixed values, said ground resistance means and one of said branch resistance means and said capacitance means exhibiting fixed twin-T operating values such that the other of said branch resistance means may be assigned a particular value which will tune said twin-T filter to a perfect notch frequency, characterized in said resistance values in the other of said branch resistance means also exceeding said particular value by a factor greater than 1.5, whereby the variation in notch depths exhibited as the other of said branch resistance measn tunes the filter is minimized.

2. A switchable notch filter comprising ground capacitance means, ground resistance means, input branch capacitance means, input branch resistance means, output branch capacitance means, and output branch resistance means, said resistance means and said capacitance means being connected to form a twin-T filter, said output branch resistance means having a plurality of individually switchable resistors for tuning said twin-T filter to a plurality of discrete notch frequencies, said input and ground resistance means and said capacitance means exhibiting fixed twin-T operating values such that said output branch resistance means may be assigned a particular value which will tune said twin-T filter to a perfect notch frequency, characterized in said resistors in said output branch resistor means all exhibiting values accompanying said fixed operating values that exceed said particular value by a factor greater than 1.5, the values of said resistors straddling a value which exceeds said particular value by a factor greater than 2, whereby changes in notch depth as the filter is tuned are minimized.

3. A switchable notch filter comprising ground capacitance means, ground resistance means, input branch capacitance means, input branch resistance means, output branch capacitance means, and output branch resistance means, said resistance means and said capacitance means being connected to form a twin-T filter, said output branch resistance means having a plurality of individually switchable resistors for tuning said twin-T filter to a plurality of discrete notch frequencies, said ground and input branch resistance means and said capacitance means exhibiting fixed twin-T operating values such that said output branch resistance means may be assigned a particular value which will tune said twin-T filter to a perfect notch frequency, characterized in said resistors in said output branch resistor means all having values that exceed said particular value by a factor greater than 1.5, the values of said resistors straddling a resistance value which exceeds said particular value by a factor greater than 2, said resistors tuning said twin-T filter to a frequency less than said perfect notch frequency by a factor 0.85.

4. A frequency-variable notch filter comprising a ground capacitor $C_0$, a ground resistor $R_0$, an input branch capacitor $C_1$, an input branch resistor $R_1$, an output branch capacitor $C_2$, and output branch resistance means $R=(R_2'+R_3')$, said capacitors and resistors being connected in twin-T arrangement so that $$\frac{\frac{1}{R_1}+\frac{1}{R_2'}}{\frac{1}{R_0}}=\frac{C_0}{C_1+C_2}$$

the values of $R_1$, $R_2'$, $R_0$, $C_1$, $C_2$ and $C_0$ being fixed and tuning the twin-T arrangement to a frequency $f_0'$, characterized in the value $$R_3'\geq\frac{R_2'}{2}$$

and the resistance means $R_2$ being variable and tuning said twin-T filter to a frequency $f_0\leq 0.85\geq f_0'$.

5. A frequency-variable notch filter comprising input branch capacitance means, output branch capacitance means, ground resistance means connected to both of said capacitance means, input branch resistance means, output branch resistance means, and ground capacitance means connected to both of said resistance means, said resistance means and said capacitance means being connected as a parallel twin-T filter, said filter tuning to a notch whose frequency can change solely in dependence upon change of one of said branch resistance means, the locus of transmission coefficients at the various notch frequencies due to tuning by said one of said branch resistance means alone forming a characteristic having a rising portion that reaches a peak and is followed by a descending portion, said one of said branch resistance means including resistance varying means for tuning said filter to a plurality of notch frequencies along a range straddling the peak of the characteristic.

6. A variable frequency notch filter comprising input branch capacitance means, output branch capacitance means, ground resistance means connected to both of said capacitance means, input branch resistance means, output branch resistance means, and ground capacitance means connected to both of said resistance means, said resistance means and said capacitance means being connected as a parallel twin-T filter, said filter tuning to a notch whose frequency can change solely in dependence upon change of said output branch resistance means, the locus of transmission coefficients at the various notch frequencies due to tuning by said output branch resistance means alone forming a characteristic having a rising portion that reaches a peak and is followed by a descending portion, said output branch resistance means including resistance varying means for tuning said filter to a plurality of notch frequencies along a range straddling the peak of the characteristic.

7. A switchable notch filter comprising input branch capacitance means, output branch capacitance means, ground resistance means connected to both of said capacitance means, input branch resistance means, output branch resistance means, and ground capacitance means connected to both of said resistance means, said resistance means and said capacitance means being connected as a parallel twin-T filter, said filter tuning to a notch whose freqeuncy can change solely in dependence upon change of one of said branch resistance means, the locus of transmission coefficients at the various notch frequencies due to tuning by said one of said branch resistance means alone forming a characteristic having a rising portion that terminates in a peak and is followed by a descending portion, said one of said branch resistance means including resistance varying means for tuning said filter to a plurality of notch frequencies along a range straddling the peak of the characteristic, said resistance varying means including a plurality of resistors of different values and selectively operable switch means for connecting one of said resistors into circuit with said filter.

8. A switchable notch filter comprising fixed input branch capacitance means, fixed output branch capacitance means, fixed ground resistance means connected to both of said capacitance means, fixed input branch resistance means, output branch resistance means, and fixed ground capacitance means connected to both of said resistance means, said resistance means and said capacitance means being connected as a parallel twin-T filter, said filter tuning to a notch whose frequency can change solely in dependence upon change of said output branch resistance means, the locus of transmission coefficients at the various notch frequencies due to tuning by said output branch resistance means alone forming a characteristic having a rising portion that reaches a peak and is followed by a descending portion, said output branch resistance means including resistance varying means for tuning said filter to a plurality of notch frequencies along a range straddling the peak of the characteristic, said resistance varying means including a plurality of resistors of different values and selectively operable switch means for connecting one of said resistors into circuit with said filter.

9. A variable frequency notch filter comprising input branch capacitance means, output branch capacitance means, ground resistance means connected to both of said capacitance means, input branch resistance means, output branch resistance means, and ground capacitance means connected to both of said resistance means, said resistance means and said capacitance means being connected as a parallel twin-T filter, said filter tuning to a notch whose frequency can change solely in dependence upon change of said output branch resistance means, the locus of transmission coefficients at the various notch frequencies due to tuning by said output branch resistance means alone forming a characteristic having a rising portion that reaches a peak and is followed by a descending portion, said output branch resistance means including resistance varying means for tuning said filter to a plurality of notch frequencies along a range straddling the peak of the characteristic, said resistance varying means changing the value of said output branch resistance means to substantially twice the lowest value.

10. A switchable notch filter comprising fixed input branch capacitance means, fixed output branch capacitance means, fixed ground resistance means connected to both of said capacitance means, fixed input branch resistance means, output branch resistance means, and fixed ground capacitance means connected to both of said resistance means, said resistance means and said capacitance means being connected as a parallel twin-T filter, said filter tuning to a notch whose frequency can change solely in dependence upon change of said output branch resistance means, the locus of transmission coefficients at the various notch frequencies due to tuning by said output branch resistor means alone forming a characteristic having a rising portion that terminates in a peak and is followed by a descending portion, said output branch resistance means including resistance varying means for tuning said filter to a plurality of notch frequencies along a range straddling the peak of the characteristic, said resistance varying means including a plurality of resistors of different values and selectively operable switch means for connecting one of said resistors into circuit with said filter, said resistance varying means changing the value of said output branch resistor means to substantially twice the lowest value.

11. An oscillator comprising an amplifier having an input and an output, filter input branch capacitance means, filter output branch capacitance means, filter ground resistance means connected to both of said branch capacitance means, filter input branch resistance means, filter output branch resistance means, filter ground capacitance means connected to both of said branch resistance means, said capacitor means and said resistance means forming a parallel twin-T filter having an input connected to the output of said amplifier and having an output connected to the input of said amplifier, said filter tuning to a notch whose frequency can change solely in dependence upon change of one of said branch resistance means, the locus of transmission coefficients at the various notch frequencies due to tuning by said one of said branch resistance means alone forming a characteristic having a rising portion that reaches a peak and is followed by a descending portion, said one of said branch resistance means including resistance varying means for tuning said filter to a plurality of notch frequencies along a range straddling the peak of the characteristic, said amplifier having a substantially constant amplification over a band over which said varying means tune said filter.

12. An oscillator comprising an amplifier having an input and an output, filter input branch capacitance means, filter output branch capacitance means, filter ground resistance means connected to both of said branch capacitance means, filter input branch resistance means, filter output branch resistance means, and filter ground capacitance means connected to both of said branch resistance means, said capacitance means and said resistance means forming a parallel twin-T filter having an input connected to the output of said amplifier and having an output connected to the input of said amplifier, said filter tuning to a notch whose frequency can change solely in dependence upon change of said output branch resistance means, the locus of transmission coefficients at the various notch frequencies due to tuning by said output branch resistance means alone forming a characteristic having a rising portion that terminates in a peak and is followed by a descending portion, said output branch resistance means including resistance varying means for tuning said filter to a plurality of notch frequencies along a range straddling the peak of the characteristic, said amplifier having a substantially constant amplification over a band over which said varying means tune said filter.

13. An oscillator comprising an amplifier having an input and an output, filter input branch capacitance means, filter output branch capacitance means, filter ground resistance means connected to both of said branch capacitance means, filter input branch resistance means, filter output branch resistance means, and filter ground capacitance means connected to both of said branch resistance means, said capacitance means and said resistance means forming a parallel twin-T filter having an input connected to the output of said amplifier and having an output connected to the input of said amplifier, said filter tuning to a notch whose frequency can change solely in dependence upon change of said filter output branch resistance means, the locus of transmission coefficients at the various notch frequencies due to tuning by said filter output branch resistor means alone forming a characteristic having a rising portion that reaches a peak and is followed by a descending portion, said filter output branch resistance means including resistance varying means for tuning said filter to a plurality of notch frequencies along a range straddling the peak of the characteristic, said amplifier having a substantially constant amplification over a band over which said resistance varying means tune said filter, said resistance varying means including a plurality of resistors of different values and selectively operable switch means for connecting one of said resistors into circuit with said filter.

14. An oscillator comprising an amplifier having an input and an output, filter input branch capacitor means, filter output branch capacitor means, filter ground resistor means connected to both of said capacitor means, filter input branch resistor means, filter output branch resistor means, and filter ground capacitor means connected to both of said resistor means, said capacitor means and said resistor means forming a parallel twin-T filter having an input connected to the output of said amplifier and having an output connected to the input of said amplifier, said filter tuning to a notch whose frequency can change solely in dependence upon change of said filter output branch resistor means, the locus of transmission coefficients at the various notch frequencies due to tuning by said filter output branch resistor means alone forming a characteristic having a rising portion that terminates in a peak and is followed by a descending portion, said filter output branch resistor means including resistance varying means for tuning said filter to a plurality of notch frequencies along a range straddling the peak of the characteristic, said amplifier having a substantially constant amplification over a band over which said resistance varying means tune said filter, said resistance varying means changing the value of said filter branch resistor means to substantially twice the lowest value.

15. An oscillator comprising an amplifier having an input and an output, filter input branch capacitor means, filter output branch capacitor means, filter ground capacitor means, filter input branch resistor means, filter output branch resistor means, and filter ground resistor means, said capacitor means and said resistor means forming a parallel twin-T filter having an input connected to the output of said amplifier and having an output connected to the input of said amplifier, said filter output branch resistor means having a plurality of individually switchable resistors for tuning said twin-T filter to a plurality of discrete notch frequencies, said input branch and ground resistor means and said capacitor means having fixed values such that said filter output branch resistor means may be assigned a particular value which will tune said twin-T filter to a perfect notch frequency, said resistors in said filter output resistor means all having values that exceed said particular value by a factor greater than 1.5.

16. An oscillator comprising an amplifier having an input and an output, filter input branch capacitor means, filter output branch capacitor means, filter ground capacitor means, filter input branch resistor means, filter output branch resistor means, and filter ground resistor means, said capacitor means and said resistor means forming a parallel twin-T filter having an input connected to the output of said amplifier and having an output connected to the input of said amplifier, said filter output branch resistor means having a plurality of individually switchable resistors for tuning said twin-T filter to a plurality of discrete notch frequencies, said ground and input branch resistor means and said capacitance means having fixed values such that said filter output branch resistor means may be assigned a particular value which will tune said twin-T filter to a perfect notch frequency, said resistors in said filter output resistor means all having values that exceed said particular value by a factor greater than 1.5, said resistors straddling a value which exceeds said particular value by a factor greater than 2.

References Cited

UNITED STATES PATENTS

| | | | |
|---|---|---|---|
| 3,072,868 | 1/1963 | Lucka et al. | 333—75 |
| 3,223,941 | 12/1965 | Schroeder et al. | 333—75 |
| 2,996,689 | 8/1961 | Janz | 333—75 |
| 3,009,121 | 11/1961 | Loebenstein | 333—75 |
| 3,174,111 | 3/1965 | Grover | 330—28 |
| 2,619,534 | 11/1952 | Payne. | |
| 2,549,553 | 4/1951 | Wigan. | |

HERMAN K. SAALBACH, Primary Examiner

C. BARAFF, Assistant Examiner

U.S. Cl. X.R.

330—28; 331—142; 333—70